UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

FILAMENT FOR INCANDESCENT ELECTRIC LAMPS.

SPECIFICATION forming part of Letters Patent No. 365,509, dated June 28, 1887.

Application filed August 7, 1882. Serial No. 68,654. (No specimens.)

*To all whom it may concern:*

Be it known that I, THOMAS A. EDISON, of Menlo Park, in the county of Middlesex and State of New Jersey, have invented a new and useful Improvement in Incandescing Conductors for Electric Lamps, (Case No. 440;) and I do hereby declare that the following is a full and exact description of the same.

The object I have in view is to produce a method and material for forming flexible carbon filaments for use as the incandescing conductors of electric lamps which will be suitable for many purposes. This I accomplish by carbonizing an oxidized drying-oil.

The drying-oil is formed into a tough flexible sheet or membrane by drying or baking. The filaments are punched or cut from this sheet and then carbonized by heat under strain and pressure; or the sheet may be first carbonized and the filaments punched or cut from it after carbonization. Instead of first forming the drying-oil into sheets it may be molded directly into filaments, or run out into a long filament and cut into proper lengths before carbonization.

Any drying-oil may be used—such as linseed, cotton-seed, poppy-seed, or nut oil.

To form the drying-oil into sheets, thin polished metallic plates may be coated with it in the form of a liquid as free as possible from gritty and other foreign substances. The plates are then dried or baked until the coating forms a tough flexible sheet or membrane. The metallic plates are then eaten away by an acid, leaving the sheets of oxidized drying-oil free and intact. The filaments are punched or cut from the sheets and are carbonized by heat under strain and pressure; or the sheets may be first carbonized and the filaments punched from them after carbonization.

Plates of other material than metal which is capable of being dissolved by a substance not attacking the oxidized drying-oil may be used to receive the drying-oil. Glass or mica plates could be used for the purpose and be dissolved by hydrofluoric acid, or plates of gelatine may be used and be dissolved by water.

The drying-oil in a solid or semi-solid state may be forced out through dies under heat and pressure, or pressure alone, in the form of a long filament or a thin sheet, which is dried or baked.

The long filament may be cut into proper lengths and provided with enlarged ends before carbonization, while the filaments of proper shape and size may be punched or cut from the sheet before or after carbonization.

Carbon filaments formed of carbonized oxidized drying-oil are suitable for use as the incandescing conductors of electric lamps, and are flexible and have a high resistance.

What I claim is—

1. A flexible carbon filament for the incandescing conductor of an electric lamp, formed of carbonized oxidized drying-oil, substantially as set forth.

2. The method of forming flexible carbon filaments for the incandescing conductors of electric lamps, consisting in drying or baking drying-oil and carbonizing the same by heat, the material being reduced to the desired size and shape before or after carbonization, substantially as set forth.

This specification signed and witnessed this 3d day of June, 1882.

THOS. A. EDISON.

Witnesses:
RICHD. N. DYER,
EDWARD H. PYATT.